Figure 5:
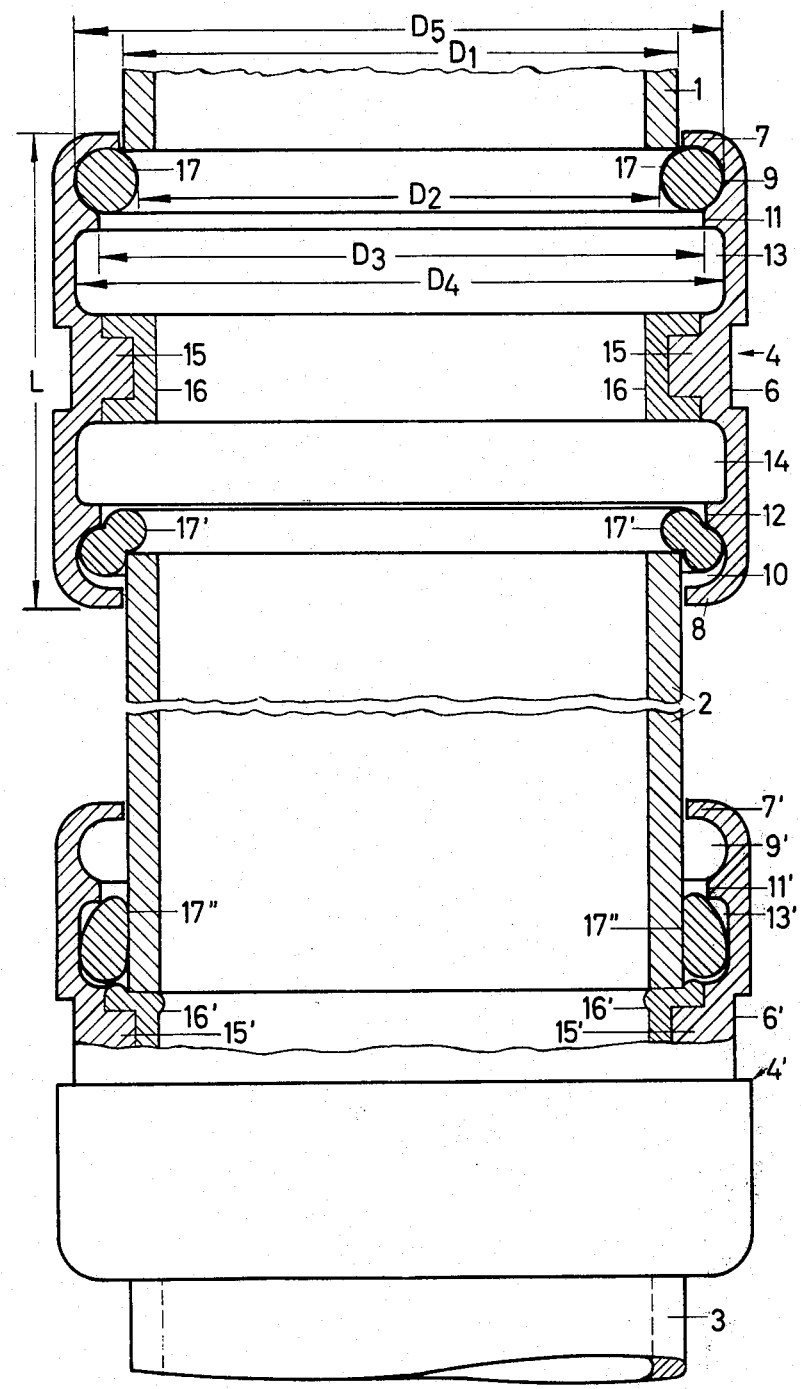

United States Patent [19]
Mengeringhausen

[11] 3,917,325
[45] Nov. 4, 1975

[54] JOINTS FOR PIPES IN A SOCKET

[75] Inventor: Max Mengeringhausen, Wurzburg, Germany

[73] Assignee: Mero A.G., Zug, Switzerland

[22] Filed: Oct. 9, 1973

[21] Appl. No.: 404,670

[30] Foreign Application Priority Data
Oct. 9, 1972 Germany............................ 2249455

[52] U.S. Cl.................... 285/344; 285/23; 285/155; 285/369; 285/379; 285/383; 285/423; 285/DIG. 16
[51] Int. Cl.² ........................................ F16L 17/02
[58] Field of Search............. 285/344, 155, DIG. 16, 285/23, 379, 383, 369, 423; 277/207 A

[56] References Cited
FOREIGN PATENTS OR APPLICATIONS

| | | | |
|---|---|---|---|
| 1,919,549 | 11/1970 | Germany | 285/344 |
| 916,623 | 1/1963 | United Kingdom | 285/369 |
| 821,365 | 8/1937 | France | 285/344 |
| 899,580 | 12/1953 | Germany | 285/344 |

*Primary Examiner*—Dave W. Arola
*Attorney, Agent, or Firm*—Jacobi, Lilling & Siegel

[57] ABSTRACT

A joint for a pipe in a socket including at least one sealing ring removably mounted near the socket entrance in an inner annular readiness space, the inside diameter of the sealing ring being smaller than the outside diameter of the pipe, a socket wall constriction disposed inwardly of the annular readiness space, and a second inner annular space disposed inwardly of the wall constriction. When the spigot end of the pipe is inserted within the socket, the sealing ring is deformed by the pipe end, compressed by the wall constriction and snapped into the second inner annular space. Inwardly of the second inner annular space, an abutment is provided with an elastic sealing surface for the spigot end of the pipe which serves to produce a counter-pressure to press the sealing ring against a peripheral region of the wall constriction away from the abutment.

10 Claims, 5 Drawing Figures

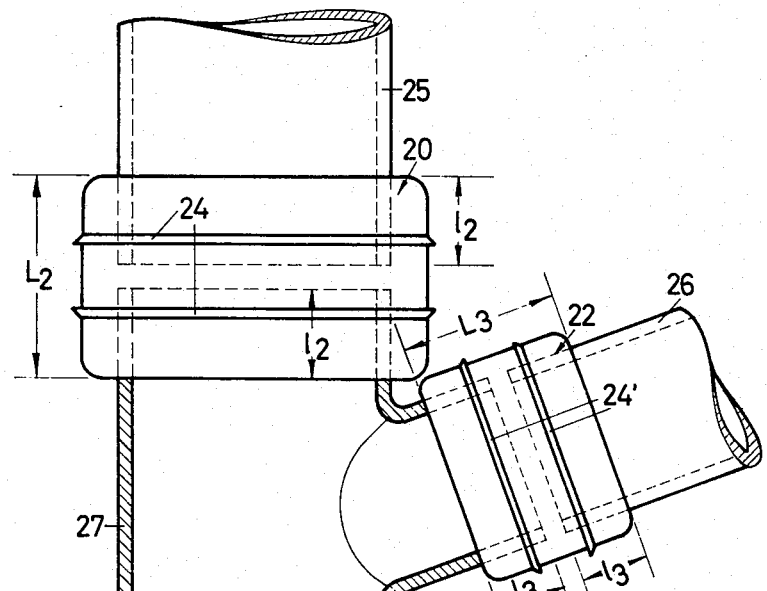
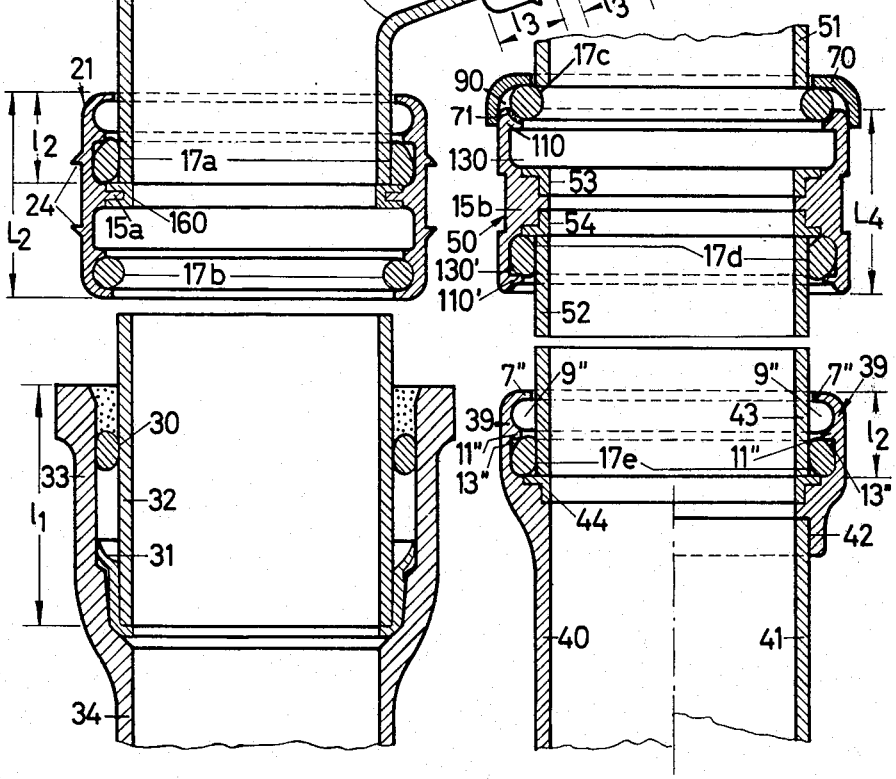
FIG. 1  FIG. 2  FIG. 3  FIG. 4

JOINTS FOR PIPES IN A SOCKET

The invention concerns a joint for pipes in a socket having at least one abutment for the spigot end of a pipe and at least one sealing ring arranged in an inner annular space near the socket entrance, the inside diameter of said sealing ring being smaller than the outside diameter of the spigot end.

In a known joint for socketed pipes (German Pat. No. 1,043,730), the seal of the plain (smooth) cylindrical pipe end (spigot end) in the socket occurs by the joint action of an "outer seal ring" in the form of a roll ring of circular cross-section and of an "inner seal ring" of Z-shaped cross-section, which elastically supports the sealed-in spigot end at the socket base, facilitates the insertion of the spigot end into the socket, and together with the outer seal ring secures the sealed-in spigot end against axial tractions and transverse forces. This type of connection, however, is limited to socketed pipes, and besides it requires a rather large insertion path for the plain cylindrical pipe end into the sealing position as well as an exact prior fitting of the two seal rings on the plain cylindrical pipe end, to insure successful sealing.

It is further known (German Disclosure No. 1,600,623) how to use for the connection of two plain cylindrical pipe ends a double or slip-on socket with two roll rings, but these, too, must be carefully fitted onto the pipe ends before inserting the pipe ends into the double socket, with adverse effect on the installation time. Also, this known double socket has a great overall length, resulting in relatively long insertion paths for the pipe ends, so that this pipe connection is not practical for socketless drain pipes with relatively short-legged bends and branch pieces.

Then also joints for two plain cylindrical pipe ends with the use of a slip-on socket are known (German Pat. Nos. 1,141,144 and 1,019,875) where the sealing or roll rings are arranged in the socket ready to function, so that the time-consuming applying thereof on the pipe ends to be sealed in is eliminated. For the production of the seal, however, it is necessary in the one known design first to insert the pipe ends into the double socket and then to pull them back again, to bring the sealing rings to their sealing positions near the entrance ends of the socket. The uncertainty factor of this type of connection resides in the not exactly controllable length of the pull-back path for the pipe ends, and because of the relatively long insertion path necessary here again, this known connection is not suitable for drain pipe systems with short-legged bends or branch pieces, either. In other known design, instead, the sealing rings are present substantially axially immovable in annular grooves inside the slip-on socket, so that the spigot ends introduced into the socket slide past the sealing rings with friction, resulting not only in a relatively high insertion resistance, but also, even if the profile or shape of the sealing rings is complicated, in questionable sealing or limited internal pressure absorbable by the seal.

Further defects of these known seals consist in that they do not reliably absorb disturbing forces in longitudinal direction of the pipe axes or normal thereto and the necessary sound absorption in the region of the socket is not insured because here either a physical contact between the pipe ends and the socket is purposely brought about to obtain the connection, or, if a clearance exists, an unintentional direct contact between the pipe ends and the socket may occur which permits a physical transmission of sound.

The basic problem of the invention is to provide a joint for pipes in a socket which offers a further simplification of work and a saving of installation time, permits a shortening of the insertion path required for the sealing of the socket for the plain cylindrical pipe end or spigot and to be sealed in, insures a seal also at relatively high internal pressures in the pipes and hence also a reliable fixation of the sealed-in pipes against anxial displacement, allows to a certain degree also an oblique introduction of the pipe end or spigot end into the socket, and insures a satisfactory seal also if the axes of the sockets and of the pipes extend somewhat obliquely relative to each other during and after the sealing-in. The insertion resistance for the pipes to be sealed in is to be according to practice, i.e., relatively low, and besides the joint is to be suitable for socketed pipes as well as for pipes with plain cylindrical outer walls at the ends with the aid of a slip-on or double socket, where the sockets and pipes may be made of any materials of the necessary strength. Also a good sound absorprion in the socket region is to be insured.

According to the invention, this problem is solved in a joint of the above defined kind in the state of the socket as delivered — is disposed releasable as a roll ring in the internal annular space designed as readiness space, that between this readiness space and the abutment at the socket base a sealing ring space is provided behind a compression collar for the roll ring which, upon insertion of the spigot end into the socket, rolls over the compression collar suddenly with formation of an axial shock component, expands into the sealing ring space and in so doing presses the spigot end against the abutment at the socket base, which abutment presents an elastic sealing surface. Thus, in advantageous manner, the sealing elements lie ready to function inside the socket, which may either be provided at one pipe end to form a socketed pipe or be designed as a double or slip-on socket to connect two plain cylindrical (socketless) pipe ends. By avoiding the previous fitting of one or more sealing rings on the pipe end or ends to be sealed in, the desired simplification of work and saving of installation time is obtained and a source of unsafeness is eliminated. Upon insertion of the pipe or spigot end to be sealed-in into the socket, the roll ring disposed releasable and ready to function in the readiness space near the socket entrance is taken along by friction by the spigot end and is rolled over the compression collar which deforms the roll ring and thus causes an accumulation of energy, which is discharged after a dead point is overcome and causes a so-called sealing shock in the longitudinal axis of the pipe toward the socket base. The roll ring then expands suddenly into the sealing ring space and in so doing presses the edge of the spigot end against the elastic sealing surface of the abutment at the socket base, even if the spigot end was introduced somewhat obliquely into the socket. The flattened roll ring now sitting in the sealing ring space secured the sealed-in spigot end against axial tractions, while the elastic sealing abutment absorbs axial shearing forces. The sudden sealing in of the spigot end into the socket requires only a very short insertion path for the spigot end into the socket, as the roll path of the roll ring is correspondingly minimal, so that such sockets can be produced with an extremely short overall length and yet a satisfactory seal is obtained, which is even increased with increasing internal pressure in the pipe. The socket is therefore especially suitable for connection with short connecting legs of branch pieces, pipe bends and the like, as are preferred recently precisely for cast iron socketless drain pipe systems.

By the joint action of the flattened roll ring in the sealing ring space with the immediately adjacent abutment which elastically supports the edge of the spigot end in axial direction, while the roll ring supports the spigot end normal to the pipe axis, a reliable clamping of the spigot end in the socket is obtained, which also counteracts a torque on the sealed-in spigot end. In fact, it is obtained by this arrangement that an elastic restoring force occurs when external forces (or in the case of horizontal pipes also the dead weight) act perpendicularly or almost perpendicularly to the longitudinal axis of the pipes. This restoring force also prevents a major sagging of horizontal pipes and the occurrence of leaks if in accordance with the needs of the practice a slight downward angle of the sealed-in spigot end relative to the longitudinal axis of the socket is required for example for reasons of creating an outflow gradient or the like. Production of the sealed connection is extremely simple and — as has been mentioned — successful even if the spigot end is inserted into the socket somewhat obliquely. For even at considerable angle deviations from the socket axis the effect of "energy accumulation" in the roll ring and of "sealing shock" with the result of a reliable tight connection is sure to occur.

Another advantage of the joint for pipes according to the invention consists in that the spigot end or ends are mounted in the socket in longitudinal direction as well as crosswise to the longitudinal direction exclusively in elastic sealing material and no contact exists between the pipe and socket materials, so that a physical sound transmission in the region of the socket is precluded. Also, the usual manufacturing tolerances, e.g. in cast iron pipes, have no adverse effect in the seal according to the invention.

Expediently the dimensional ratios between the roll ring on the one hand and the compression collar as well as the sealing space, on the other, are selected so that immediately after rolling over the compression collar and after its expansion into the sealing space, the roll ring comes to a standstill and is pressed by the counter-pressure produced by the elastic abutment at the socket base against a peripheral region of the compression collar. Due to the fact that after completed sealing shock and pressing of the edge of the spigot end against the elastic abutment at the socket base the roll ring comes to a standstill directly behind the compression collar and closely alongside the elastic abutment, a fixing of the spigot end in the socket is achieved, which is further strengthened by the bearing contact of the roll ring at the inner edge of the compression collar, to the effect that the resistance to axial traction forces at the sealed-in plain cylindrical pipe end is further considerably increased.

Expediently the readiness space for the roll ring is limited toward the outside by a holding and guiding collar, and the roll ring may be fixed in the readiness space by self-clamping and/or by a tear-off adhesive application. By this holding and guiding collar, in the state of the socket as delivered, the roll ring is fixed exactly in the position which is important for its later function to form the seal. After completed connection of the pipes or after the seal has been made, this holding and guiding collar constitutes an additional safety against an undesired great angle deviation between pipe axis and socket axis (e.g. when relatively long pipes are installed horizontally and the dead weight could cause sagging — also during installation). Besides, upon insertion of the spigot end into the socket, this collar serves as guide for the spigot end which prevents that the spigot end to be sealed in is inserted too obliquely into the socket, that is, the guiding collar helps in a way to guide the spigot end in a straight line.

The holding and guiding collar may alternatively be designed as a separate part which is removably placed on the outer circumference of the socket. In this case, in the state of the socket as delivered, the collar serves as protection and fixing means for the roll ring which can be removed before or after production of the pipe connection, owing to which a further reduction of the overall socket length can be obtained.

Alternatively it is possible to leave the readiness space for the roll ring substantially open toward the outside, the roll ring being releasably held therein exclusively by a tear-off adhesive application.

Expediently the elastic, sealing surface of the abutment at the socket base is formed by at least one sealing ring. Also this "second" sealing ring is then ready to function inside the socket, which receives the spigot end or ends to be sealed in without their requiring any preparation by the fitting of seal rings.

When the socket is made of a suitable plastic, the surface of the abutment at the socket base may be soft-elastic, while the rest of the socket is maintained in a tough-hard state. In this case, second sealing rings and the time for their installation are saved.

Advantageously the inside diameter of the compression collar is about half way between the cross-section center of the slack roll ring and the outside diameter thereof, and the axial cross-section width of the compression collar is advantageously a fraction of the cross-section diameter of the roll ring. These conditions insure, when the spigot end is inserted into the socket, a satisfactory rolling of the roll ring out of its readiness space and rolling over the compression collar with subsequent expansion of the roll ring into the sealing space.

Appropriately the compression collar is rounded on the entrance side and sharp-edged on the side of the sealing ring space. This design favors, on the one hand, the rolling of the roll ring over the compression collar and, on the other hand, when the roll ring has snapped in, its axial fixation when axial traction forces occur at the sealed-in spigot end.

Appropriately the sealing ring space terminates directly in the abutment for the support of the spigot end, and its axial width is about 1.2 to 1.8 times greater than the cross-section diameter of the roll ring, while the inside diameter of the sealing space approximately corresponds to that of the readiness space. This arrangement and these conditions further the desired short socket lengths, while on the other hand the roll ring, flattened in its sealing position, practically fills the sealing ring space and at the same time lies closely alongside the elastically sealing abutment and the inside of the compression collar.

For the fixation of the roll ring in its position ready to function before the production of the seal, the readiness space appropriately presents a clear cross-section closely adapted to the roll ring.

A socket having the above features may be molded on, pressed on, welded on or glued on by means of a cylindrical recess at a plain cylindrical end of a pipe. The kind of connection depends on the particular material used for the socket and pipe.

If pipes with plain cylindrical ends are to be sealed in and joined in a double socket, the socket may be designed in mirror symmetry in the interior according to the above criteria and contain two roll rings and a common abutment for the support of the spigot ends of the pipe.

In such a double socket, the abutment for the support of the spigot ends of the pipes may be embraced by a sealing ring with U-shaped cross-section. In an alternative design this abutment may be enclosed by separate sealing rings of angular cross-section.

The invention is suitable for any pipe and socket materials, socketed pipes or cast iron and pipes with plain cylindrical outer walls, which may be made, not only of metal, but also of glass for use in laboratories and in the chemical industry or of plastics. asbestos cement or stoneware.

The invention will be described more fully below with reference to the drawings of several embodiments, in which:

FIG. 1 shows a partial sectional view of a socketed pipe joint of conventional type:

FIG. 2 a partial sectional view of a socketless drain pipe in the form of a branch piece with two different diameters, to which socketless pipes are connected by means of double sockets according to the invention;

FIG. 3 a partial sectional view, in the left half with a socket molded onto a drain pipe, and in the right half with a socket according to the invention fastened on a plain cylindrical pipe end;

FIG. 4 a sectional view of a modified double socket with a holding and guiding collar at the upper end designed as a separate part; and FIG. 5 a partial sectional view of a pipe joint with two double sockets, illustrating the different stages during the production of the pipe connection.

In the example according to FIG. 5 two double or slip-on sockets, 4, 4′ of the spigot ends of three cylindrical pipes 1, 2 and 3, pipe 1 being shown in a position before insertion into the socket 4, the upper spigot end of pipe 2 at the start of insertion into socket 4, and the lower spigot end of pipe 2 after insertion and production of the sealed connection in socket 4′. The double sockets 4 and 4′ are identical and each provided with a median outer annular groove 6, 6′ for a fastening clamp not shown.

The double sockets 4 and 4′ further contain in mirror-symmetrical arrangement inwardly drawn holding and guiding collars 7 and 8 or respectively 7′, internal annular spaces 9, 10, respectively 9′, compression collars 11, 12, respectively 11′, sealing ring spaces 13, 14, respectively 13′, and respectively an annular abutment 15, 15′, each embraced by a sealing ring 16, 16′ of U-shaped cross-section and serving to support the spigot ends of the sealed-in pipes, as will be explained later.

The internal annular spaces 9, 10, respectively 9′ serve as readiness spaces for roll rings in the state of the sockets as delivered, as is shown in the upper part of FIG. 5 with reference to the roll ring 17. In the example according to FIG. 5, the roll rings are fixed ready to function in their readiness spaces by the holding collars 7, 8, respectively 7′ as well as by inherent tension. For this purpose the readiness spaces present clear cross-sctions closely adapted to the roll rings. For the production of the sealed pipe connection, the pipes are inserted into the double sockets successively through the openings in the holding and guiding collars 7, 8 respectively 7′, the guiding collars fulfilling at the same time a centering function. As is shown with reference to pipe 1 in the upper part of FIG. 5, the outer edge of the spigot end engages at the outer circumference of the roll ring 17 approximately half way between the inside diameter D2 of the roll ring and the cross-section center of the roll ring. Now if the manual pressure is increased in the longitudinal axis of the pipe, one obtains the stage shown at 17′ in FIG. 5, where the deformation of the roll ring 17′ by the compression collar 12 begins, energy being accumulated in roll ring 17′. With further increase of the pressure in the direction of the longitudinal axis of the pipe, the roll ring finally, after overcoming a dead point, rolls over the compression collar 12 suddenly and expands into the sealing ring space 14. This stage is illustrated by the compressed roll ring 17″, which almost completely fills the sealing ring space 13′. During this sudden expansion of the roll ring into the sealing ring space a so-called sealing shock in the longitudinal axis of the pipe occurs, which causes the end face of the sealed-in spigot end to be pressed against the sealing ring 16; with slight deformation thereof, this deformation being shown in FIG. 5 in exaggeration for better illustration. The drawing clearly indicates that after the sealing of the spigot end into the double socket 4′ the roll ring 17″ is pressed against the inner sharp edge of the compression collar 11′ by the counter-pressure produced by the sealing ring 16′, whereby a satisfactory seal is achieved with simultaneous axial fixation of the sealed-in spigot end, which is further improved by the pressure of the medium transported through this pipe connection. The seal under the pipes in the double socket is preserved even if the pipes are situated somewhat obliquely in the socket, for example, under an angle deviation of the longitudinal axis of the socket of the order of 3° to 5°.

To achieve the above results at extremely short insertion paths for the spigot ends into the sockets and consequently extremely short socket overall lengths, the following dimensional ratios are of importance:

The outside diameter D5 of the roll ring 17 in the slack state should correspond to the outside diameter of the readiness space 9, 10 respectively 9′ and approximately to the inside diameter D4 of the sealing ring space 13, 14 respectively 13′. The compression collar 11, 12 respectively 11′ should have an inside diameter D3 which lies approximately half way between the cross-section center of the slack roll ring and its outside diameter D5. The axial cross-section width of the compression collar, on the other hand, needs to be only a fraction of the cross section diameter of the roll ring. The axial width of the sealing ring space 13, 14 respectively 13′ should be approximately 1.2 to 1.8 times greater than the cross-section diameter of the roll ring. Further there applies:

$D1 = D2 + \frac{1}{4} d$ $D3 = D2 + \frac{3}{4} d \quad d = D5 - D2$

It is evident from the above that the inside diameter D3 of the compression collar e.g. 11 is smaller than the outside diameter D5 of the slack roll ring 17, but greater than the diameter of the slack roll ring between two of its cross-section centers.

In an embodiment found satisfactory in the practice, having for example the following dimensions:

| | |
|---|---|
| Outside diameter D5 of the slack roll ring | = 61 mm |
| Inside diameter D2 of the slack roll ring | = 49 mm |
| Inside diameter D4 of the sealing ring space | = 61 mm |
| Pipe outside diameter D1 | = 52 mm |
| Inside diameter D3 of the compression collar | = 58 mm | it was possible to hold the overall length L of the double socket in a size of the order of 40 – 50 mm.

The double or slip-on sockets 20, 21 and 22 shown in FIG. 2 correspond practically in design and in their function to the double sockets 4 and 4' explained with reference to FIG. 5, with the exception that instead of an external annular groove (6, 6') they each have two annular shoulders 24, 24' for a fastening clamp (not shown). In this example the double sockets 20, 21 and 22 serve to connect the spigot ends of drain pipes 25, 26 for example of cast iron, with a socketless branch piece 27 having two different diameters, which may also be made of cast iron. The branch piece 27 has according to FIG. 2 very short legs, as is preferred in recent times. This, however, requires correspondingly short insertion parts for the legs and spigot ends into the double sockets, as assured by the invention and as indicated by 1-2 and 1-3 in FIG. 2. It is thus possible in turn to make the overall lengths L-2 and L-3 of the double sockets very small and for example, in the case of socketless cast iron drain pipes, to make them approximately in the length which was until now specified in the respective standard for socketed pipes and is shown in FIG. 1 with reference to a conventional socket pipe joint (according to German Pat. No. 1,043,730). A comparison of FIGS. 1 and 2 clearly indicates the different insertion paths or sealing paths for the spigot ends and legs of the drain pipes or of the shaped piece. The insertion path 1-2 in the double sockets 20, 21 is very small, compared with FIG. 1 even smaller than one half of the usual insertion path 1—1 in the known socket pipe joint. The overall length L2 of the double sockets 20, 21 is likewise smaller than or approximately equal to the overall length of a single socket on a conventional socket pipe (FIG. 1). These advantages, or great importance in the practice, are attributable to the extremely short "roll path" for the roll rings, of which one, 17a, is shown in sealing position alongside the sealing ring 160 at the socket base 15a and one at 17b in the readiness space. A comparison of FIGS. 1 and 2 further indicates that with the aid of the double sockets according to the invention also combinations with pipes are possible which are sealed-in in socket pipes in known manner. While in the case of the known joint for socket pipes according to FIG. 1 two sealing rings 30, 31 must be carefully fitted on the spigot end 32 before the spigot end 32 can be inserted and sealed-in in the socket 33 of pipe 34, it suffices according to FIG. 2 to press the spigot ends of the pipes to be sealed in or the legs of the branch piece 27 into the double socket, a tight and firm fit of the spigot ends or legs in the double socket being immediately obtained following the previously mentioned sealing shock.

FIG. 3 shows a single socket 39 in section, namely in the left half of the sectional view molded on, for example, at a cast iron drain pipe 40, and in the right half of the sectional view pressed on, welded on or glued on a plain cylindrical pipe end 41 by means of a cylindrical recess 42. The pipe end 41 may be a part of a socketless plastic pipe cut to the desired length. The insertion or sealing path 1 2 is extremely short and amounts to only a fraction of the insertion path 1 1 as per FIG. 1, so that there results also a short total structural length for the socket 39. Socket 39 contains a holding and guiding collar 7'', a readiness space 9'', a compression collar 11'' and a sealing ring space 13'' similar to the embodiment according to FIG. 5, a roll ring 17e being indicated in the latter in compressed sealing installed position, while the spigot end 43 is pressed against a sealing ring 44 of angular cross-section at the socket base.

FIG. 4 shows an embodiment of a double or slipon socket 50 similar to that in FIG. 5, but where the holding and guiding collar 70 forms a separate part, which in the form of a ring of for example, cheap plastic is detachably placed on the outer circumference of the socket. In this case, therefore, the readiness space 90 for the roll ring 17c is closed off from the outside by the ring 70, which, in the state of the socket as delivered, fixes the roll ring in the readiness space and facilitates the correct introduction of a spigot end 51 into the double socket 50. After the connection has been made, ring 70 can be removed, resulting in a further shortening of the socket length from L2 to L4. Besides, the double socket 50 again presents a compression collar 110, 110' and a sealing ring space 130, 130' for the roll ring 17c, 17d. The annular abutment 15b for the support of the spigot ends 51, 52 is here enclosed by two sealing rings 53, 54 of angular cross-section. The roll ring 17c may be fixed in the readiness space 90 by inherent tension and possibly additionally be a tear-off adhesive application. Alternatively the roll ring (e.g. 17c) may be fixed exclusively by a tear-off adhesive application 71 in the readiness space without using a ring 70. Such a tear-off adhesive application is sufficient to secure the correct function of the roll ring until, as the spigot end 52 is pushed in, the roll ring is rolled over the compression collar 110', at which time the adhesive application tears off and the roll ring 17d expands into the sealing ring space 130', as is indicated in FIG. 4.

If the double socket 50 is made of a suitable plastic, the sealing rings 53, 54 may be omitted and the annular abutment 15b may be designed with a rectangular internal cross-section and its surface made soft-elastic.

The types of connection shown in the examples are thus suitable both for the connection of socketless pipes with one another and with socketless branch pieces or the like as well as for the connection of socketed pipes with one another and with socketless pipes.

What is claimed is:

1. In a join for a pipe in a socket wherein at least one sealing ring is detachably disposed near the socket entrance in an inner annular readiness space, the inside diameter of said sealing ring being smaller than the outside diameter of the pipe, a socket wall constriction is disposed adjacent to and inwardly of said inner annular readiness space, a second inner annular space is disposed inwardly of the wall constriction, as sealing ring space, and the spigot end of a pipe is inserted into the socket such that the sealing ring snaps and partially expands, said sealing ring being rolled out of the first inner annular space by frictional entrainment and being compressed by the socket wall constriction, the improvement wherein the inside diameter (D4) of said sealing ring space is approximately the same as the inside diameter (D5) of said readiness space, directly behind and closely adjacent to the sealing ring space (13, 14, 13', 13'', 130, 130') an abutment (15, 15', 15a, 15b) with an elastic sealing surface for the spigot end of the pipe is provided, and the socket wall constriction comprises a compression collar (11, 12, 11', 11'', 110, 110') for the sealing ring (17, 17c) whose axial cross-sectional width is smaller than the cross-sectional diameter of the sealing ring, the spigot end of the pipe being inserted in the socket into engagement with said elastic abutment surface, whereby the sealing ring rolls over the compression collar suddenly with creation of an axial shock component and, after its partial expansion into the second sealing ring space, is pressed against a peripheral region of the compression collar away from the abutment by the counter-pressure produced by the elastic abutment surface on the spigot end.

2. A joint according to claim 1, characterized in that the inside diameter (D3) of the compression collar (11, 12, 11') lies approximately half way between the cross-sectional center of the undistorted sealing ring (17) and the outside diameter (D5) thereof.

3. A joint according to claim 1, characterized in that the compression collar (11, 12, 11') is rounded on the entrance side and sharp-edged on the side of the second sealing ring space (13, 14, 13').

4. A joint according to claim 1, characterized in that the second sealing ring space (13, 14, 13', 13'', 130, 130') presents an axial width which is approximately 1.2 to 1.8 times greater than the cross-sectional diameter of the sealing ring (17, 17c).

5. A joint according to claim 1 having at least one holding and guiding collar for the sealing ring at the socket entrance, characterized in that the holding and guiding collar (70) is a separate part which is removably mounted on the outer end of the socket (50) to define the readiness space.

6. A joint according to claim 1, characterized in that the readiness space for the sealing ring (17d) is substantially open toward the outside and the sealing ring is releasably held therein exclusively by an adhesive application.

7. A joint according to claim 1, characterized in that the socket is made of plastic, and the surface of the abutment at the socket base is of soft-elastic material.

8. A joint according to claim 1 wherein the socket has identical oppositely facing ends for the reception of the spigot ends of a pair of pipes, identical sealing rings at each socket end, and an identical elastic abutment sarface facing each socket end.

9. A joint according to claim 8, characterized in that the abutment for the support of the spigot ends of the two pipes is embraced by an end sealing ring (16, 160) 8 U-shaped cross-section.

10. A joint according to claim 7, characterized in that the abutment for the support of the spigot ends of the two pipes is enclosed by separate end sealing rings (53, 54) of angular cross-section.

* * * * *